(12) United States Patent
Reyzin

(10) Patent No.: US 6,381,375 B1
(45) Date of Patent: *Apr. 30, 2002

(54) METHODS AND APPARATUS FOR GENERATING A PROJECTION OF AN IMAGE

(75) Inventor: Igor Reyzin, Brookline, MA (US)

(73) Assignee: Cognex Corporation, Natick, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/055,543

(22) Filed: Apr. 6, 1998

Related U.S. Application Data

(63) Continuation-in-part of application No. 09/027,432, filed on Feb. 20, 1998.

(51) Int. Cl.$^7$ ............................. G06K 9/36; G09G 5/00
(52) U.S. Cl. ...................................... 382/276; 345/648
(58) Field of Search ................................ 382/276, 277, 382/293, 295, 296, 300; 345/648, 649, 672, 651, 659, 647

(56) References Cited

U.S. PATENT DOCUMENTS

| | | | |
|---|---|---|---|
| 3,816,722 A | 6/1974 | Sakoe et al. | 708/424 |
| 3,936,800 A | 2/1976 | Ejiri et al. | 382/205 |
| 3,967,100 A | 6/1976 | Shimomura | 708/446 |
| 3,968,475 A | 7/1976 | McMahon | 382/124 |
| 3,978,326 A | 8/1976 | Shimomura | 708/446 |
| 4,011,403 A | 3/1977 | Epstein et al. | 348/370 |
| 4,115,702 A | 9/1978 | Nopper | 250/559.2 |
| 4,115,762 A | 9/1978 | Akiyama et al. | 382/151 |
| 4,183,013 A | 1/1980 | Agrawala et al. | 382/173 |
| 4,200,861 A | 4/1980 | Hubach et al. | 382/216 |
| 4,254,400 A | 3/1981 | Yoda et al. | 382/194 |
| 4,286,293 A | 8/1981 | Jablonowski | 348/126 |
| 4,300,164 A | 11/1981 | Sacks | 348/251 |

(List continued on next page.)

FOREIGN PATENT DOCUMENTS

| | | |
|---|---|---|
| EP | 0 527 632 A2 | 2/1993 |
| EP | 0 777 381 A2 | 11/1996 |
| WO | WO 95/21376 | 8/1995 |
| WO | WO 95/22137 | 8/1996 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 98/52349 | 11/1998 |
| WO | WO 98/59490 | 12/1998 |
| WO | WO 99/15864 | 4/1999 |

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

(List continued on next page.)

*Primary Examiner*—Bhavesh Mehta
*Assistant Examiner*—Kanji Patel
(74) *Attorney, Agent, or Firm*—David J. Powsner

(57) ABSTRACT

Novel methods for generating a projection of an image according to the invention concurrently rotate, scale, translate, skew, shear, or otherwise transform the image via a sequence of two one-dimensional transformations. A first intermediate image is generated via affine transformation of the source along a first axis. The intermediate image is then subjected to affine transformation along a second axis, e.g., perpendicular to the first. A projection of the resultant image is generated along a selected one of the first or second axes by summing pixel intensities in corresponding rows (or columns) or by summing counts of pixels whose intensities are above or below a threshold.

26 Claims, 5 Drawing Sheets

U.S. PATENT DOCUMENTS

| | | | |
|---|---|---|---|
| 4,385,322 A | 5/1983 | Hubach et al. | 348/243 |
| 4,435,837 A | 3/1984 | Abernthy | 382/111 |
| 4,441,124 A | 4/1984 | Heebner et al. | 382/126 |
| 4,441,206 A | 4/1984 | Kuniyoshi et al. | 382/287 |
| 4,519,041 A | 5/1985 | Fant et al. | 382/141 |
| 4,534,813 A | 8/1985 | Williamson et al. | 156/212 |
| 4,541,116 A | 9/1985 | Lougheed | 382/303 |
| 4,570,180 A | 2/1986 | Baier et al. | 382/145 |
| 4,577,344 A | 3/1986 | Warren et al. | 382/100 |
| 4,581,762 A | 4/1986 | Lapidus et al. | 382/263 |
| 4,606,065 A | 8/1986 | Beg et al. | 382/170 |
| 4,617,619 A | 10/1986 | Gehly | 362/303 |
| 4,630,306 A | 12/1986 | West et al. | 382/197 |
| 4,641,349 A | 2/1987 | Flom et al. | 382/117 |
| 4,688,088 A | 8/1987 | Hamazaki et al. | 348/94 |
| 4,706,168 A | 11/1987 | Weisner | 362/18 |
| 4,707,647 A | 11/1987 | Coldren et al. | 382/151 |
| 4,728,195 A | 3/1988 | Silver | 356/394 |
| 4,730,260 A | 3/1988 | Mori et al. | 345/632 |
| 4,731,858 A | 3/1988 | Grasmueller et al. | 382/151 |
| 4,736,437 A | 4/1988 | Sacks et al. | 382/216 |
| 4,738,345 A | 4/1988 | Jenkner | 193/35 C |
| 4,742,551 A | 5/1988 | Deering | 382/170 |
| 4,752,898 A | 6/1988 | Koenig | 382/170 |
| 4,758,782 A | 7/1988 | Kobayashi | 382/148 |
| 4,764,870 A | 8/1988 | Gaskin | 348/443 |
| 4,771,469 A | 9/1988 | Wittenburg | 382/203 |
| 4,776,027 A | 10/1988 | Hisano et al. | 382/288 |
| 4,782,238 A | 11/1988 | Radl et al. | 250/559.36 |
| 4,783,826 A | 11/1988 | Koso | 382/147 |
| 4,783,828 A | 11/1988 | Sadjadi | 382/170 |
| 4,783,829 A | 11/1988 | Miyakawa et al. | 382/199 |
| 4,809,077 A | 2/1989 | Norita et al. | 348/298 |
| 4,831,580 A | 5/1989 | Yamada | 717/2 |
| 4,855,174 A | 8/1989 | Kawamoto | 428/67 |
| 4,860,374 A | 8/1989 | Murakami et al. | 382/151 |
| 4,860,375 A | 8/1989 | McCubbrey et al. | 382/303 |
| 4,876,457 A | 10/1989 | Bose | 250/559.05 |
| 4,876,728 A | 10/1989 | Roth | 382/153 |
| 4,891,767 A | 1/1990 | Rzasa et al. | 700/259 |
| 4,903,218 A | 2/1990 | Longo et al. | 345/759 |
| 4,903,824 A | 2/1990 | Takahashi | 198/853 |
| 4,907,169 A | 3/1990 | Lovoi | 700/259 |
| 4,908,874 A * | 3/1990 | Gabriel | 382/41 |
| 4,912,559 A | 3/1990 | Ariyoshi et al. | 358/261.1 |
| 4,912,659 A * | 3/1990 | Liang | 364/521 |
| 4,914,553 A | 4/1990 | Hamada et al. | 362/160 |
| 4,922,543 A | 5/1990 | Ahlbom et al. | 582/291 |
| 4,926,492 A | 5/1990 | Tanaka et al. | 382/168 |
| 4,932,065 A | 6/1990 | Feldgajer | 382/177 |
| 4,953,224 A | 8/1990 | Ichinose et al. | 382/149 |
| 4,955,062 A | 9/1990 | Terui | 382/144 |
| 4,959,898 A | 10/1990 | Landman et al. | 29/705 |
| 4,962,423 A | 10/1990 | Yamada et al. | 382/144 |
| 4,972,359 A | 11/1990 | Silver et al. | 708/428 |
| 4,982,438 A | 1/1991 | Usami et al. | 382/154 |
| 5,012,402 A | 4/1991 | Akiyama | 7000/87 |
| 5,012,433 A * | 4/1991 | Callahan et al. | 364/518 |
| 5,012,524 A | 4/1991 | LeBeau | 382/149 |
| 5,027,419 A | 6/1991 | Davis | 382/206 |
| 5,046,190 A | 9/1991 | Daniel et al. | 382/303 |
| 5,054,096 A | 10/1991 | Beizer | 382/305 |
| 5,060,276 A | 10/1991 | Morris et al. | 382/151 |
| 5,063,608 A | 11/1991 | Siegel | 382/239 |
| 5,073,958 A | 12/1991 | Imme | 382/267 |
| 5,081,656 A | 1/1992 | Baker et al. | 378/21 |
| 5,081,689 A | 1/1992 | Meyer et al. | 382/199 |
| 5,086,478 A | 2/1992 | Kelly-Mahaffey et al. | 382/151 |
| 5,090,576 A | 2/1992 | Menten | 209/587 |
| 5,091,861 A | 2/1992 | Geller et al. | 700/192 |
| 5,091,968 A | 2/1992 | Higgins et al. | 382/220 |
| 5,093,867 A | 3/1992 | Hori et al. | 382/141 |
| 5,113,565 A | 5/1992 | Cipolla et al. | 29/25.01 |
| 5,115,309 A | 5/1992 | Hang | 348/388.1 |
| 5,119,435 A | 6/1992 | Berkin | 382/145 |
| 5,124,622 A | 6/1992 | Kawamura et al. | 318/569 |
| 5,133,022 A | 7/1992 | Weideman | 382/172 |
| 5,134,575 A | 7/1992 | Takagi | 382/147 |
| 5,143,436 A | 9/1992 | Taylor et al. | 362/582 |
| 5,145,432 A | 9/1992 | Midland et al. | 445/3 |
| 5,151,951 A | 9/1992 | Ueda et al. | 382/156 |
| 5,153,925 A | 10/1992 | Tanioka et al. | 382/272 |
| 5,155,775 A | 10/1992 | Brown | 382/153 |
| 5,159,281 A | 10/1992 | Hedstrom et al. | 329/312 |
| 5,159,645 A | 10/1992 | Kumagai | 382/198 |
| 5,164,994 A | 11/1992 | Bushroe | 382/150 |
| 5,168,269 A | 12/1992 | Harlan | 345/856 |
| 5,175,808 A * | 12/1992 | Sayre | 395/133 |
| 5,179,419 A | 1/1993 | Palmquist et al. | 356/73.1 |
| 5,185,810 A | 2/1993 | Freischlad | 382/100 |
| 5,185,855 A | 2/1993 | Kato et al. | 345/441 |
| 5,189,712 A | 2/1993 | Kajiwara e tal. | 382/221 |
| 5,204,944 A * | 4/1993 | Wolberg et al. | 345/427 |
| 5,205,400 A | 4/1993 | Breuss et al. | 198/812 |
| 5,206,820 A | 4/1993 | Ammann et al. | 702/185 |
| 5,216,503 A | 6/1993 | Paik | 348/390.1 |
| 5,225,940 A | 7/1993 | Ishii et al. | 359/823 |
| 5,230,027 A | 7/1993 | Kikuchi | 382/141 |
| 5,243,607 A | 9/1993 | Masson et al. | 714/147 |
| 5,253,306 A | 10/1993 | Nishio | 382/112 |
| 5,253,308 A | 10/1993 | Johnson | 382/104 |
| 5,265,173 A | 11/1993 | Griffin et al. | 382/103 |
| 5,271,068 A | 12/1993 | Ueda et al. | 382/216 |
| 5,287,449 A | 2/1994 | Kojima | 345/161 |
| 5,297,238 A | 3/1994 | Wang et al. | 700/259 |
| 5,297,256 A | 3/1994 | Wolstenholme et al. | 702/183 |
| 5,299,269 A | 3/1994 | Gaborski et la. | 382/156 |
| 5,307,419 A | 4/1994 | Tsujino et al. | 382/153 |
| 5,307,917 A | 5/1994 | Hall | 198/313 |
| 5,311,598 A | 5/1994 | Bose et al. | 382/149 |
| 5,315,388 A | 5/1994 | Shen et al. | 348/718 |
| 5,319,457 A | 6/1994 | Nakahashi e tal. | 348/386.1 |
| 5,327,156 A | 7/1994 | Masukane e tal. | 345/634 |
| 5,329,469 A | 7/1994 | Watanabe | 700/259 |
| 5,337,262 A | 8/1994 | Luthi et al. | 702/83 |
| 5,337,267 A | 8/1994 | Colavin | 708/606 |
| 5,350,048 A | 9/1994 | Wylie | 193/35 A |
| 5,363,507 A | 11/1994 | Nakayama et al. | 345/743 |
| 5,367,439 A | 11/1994 | Mayer et al. | 362/551 |
| 5,367,667 A | 11/1994 | Wahlquist et al. | 714/32 |
| 5,371,690 A | 12/1994 | Engel et al. | 382/151 |
| 5,388,197 A | 2/1995 | Rayner | 345/723 |
| 5,388,252 A | 2/1995 | Dreste et al. | 714/46 |
| 5,398,292 A | 3/1995 | Aoyama | 382/199 |
| 5,432,525 A | 7/1995 | Maruo et al. | 345/2.2 |
| 5,440,699 A | 8/1995 | Farrand et al. | 345/740 |
| 5,455,870 A | 10/1995 | Sepai et al. | 382/147 |
| 5,455,933 A | 10/1995 | Schieve et al. | 714/27 |
| 5,471,312 A | 11/1995 | Watanabe et al. | 358/296 |
| 5,475,766 A | 12/1995 | Tsuchiya et al. | 382/144 |
| 5,475,803 A * | 12/1995 | Stearns et al. | 395/136 |
| 5,477,138 A | 12/1995 | Efjavic et al. | 324/158.1 |
| 5,481,712 A | 1/1996 | Silver et al. | 717/1 |
| 5,485,570 A | 1/1996 | Bushboom et al. | 345/751 |
| 5,491,780 A | 2/1996 | Fyles et la. | 345/233 |
| 5,495,424 A | 2/1996 | Tokura | 702/82 |
| 5,495,537 A | 2/1996 | Bedrosian et al. | 382/209 |
| 5,500,906 A | 3/1996 | Picard et al. | 382/220 |
| 5,506,617 A | 4/1996 | Parulski et al. | 348/207 |
| 5,506,682 A | 4/1996 | Pryor | 356/623 |
| 5,511,015 A | 4/1996 | Flockencier | 708/420 |

| | | | |
|---|---|---|---|
| 5,519,840 A | 5/1996 | Matias et al. ............... | 707/101 |
| 5,526,050 A | 6/1996 | King et al. .............. | 348/286.1 |
| 5,528,703 A | 6/1996 | Lee ............................ | 382/257 |
| 5,532,739 A | 7/1996 | Garakani et al. ............. | 348/87 |
| 5,539,409 A | 7/1996 | Mathews et al. ............ | 342/26 |
| 5,544,256 A | 8/1996 | Brecher et al. ............... | 382/14 |
| 5,548,326 A | 8/1996 | Michael ....................... | 348/87 |
| 5,550,763 A | 8/1996 | Michael ...................... | 702/155 |
| 5,553,859 A | 9/1996 | Kelly et al. ................. | 273/338 |
| 5,557,410 A | 9/1996 | Huber et al. ................ | 356/604 |
| 5,557,690 A | 9/1996 | O'Gorman et al. ......... | 382/151 |
| 5,566,877 A | 10/1996 | McCormack .............. | 228/105 |
| 5,568,563 A | 10/1996 | Tanaka et al. .............. | 382/144 |
| 5,574,668 A | 11/1996 | Beaty ......................... | 702/150 |
| 5,574,801 A | 11/1996 | Collet-Beillon ............ | 382/150 |
| 5,581,632 A | 12/1996 | Koljonen et al. ........... | 382/150 |
| 5,583,949 A | 12/1996 | Smith et al. ................ | 382/199 |
| 5,583,954 A | 12/1996 | Garakani ..................... | 382/278 |
| 5,586,058 A | 12/1996 | Aloni et al. .................. | 702/25 |
| 5,592,562 A | 1/1997 | Rooks ........................ | 382/150 |
| 5,594,859 A | 1/1997 | Palmer et al. .............. | 345/756 |
| 5,602,937 A | 2/1997 | Bedrosian et al. .......... | 382/151 |
| 5,608,490 A | 3/1997 | Ogawa ....................... | 396/300 |
| 5,608,872 A | 3/1997 | Schwartz et al. ........... | 709/205 |
| 5,640,199 A | 6/1997 | Garakani et al. ............. | 348/87 |
| 5,640,200 A | 6/1997 | Michael ....................... | 348/87 |
| 5,642,158 A | 6/1997 | Petry, III et al. ............. | 348/87 |
| 5,647,009 A | 7/1997 | Aoki et al. .................. | 382/100 |
| 5,657,403 A | 8/1997 | Wolff et al. ................. | 382/302 |
| 5,673,334 A | 9/1997 | Nichani et al. ............. | 382/143 |
| 5,676,302 A | 10/1997 | Petry, III .................... | 228/104 |
| 5,696,848 A | 12/1997 | Patti et al. ................... | 382/254 |
| 5,715,369 A | 2/1998 | Spoltman et al. ........... | 704/270 |
| 5,717,785 A | 2/1998 | Silver ........................ | 382/202 |
| 5,724,439 A | 3/1998 | Mizuoka et al. ............ | 382/149 |
| 5,734,807 A * | 3/1998 | Sumi .......................... | 345/427 |
| 5,742,037 A | 4/1998 | Scola et al. ................. | 235/454 |
| 5,751,853 A | 5/1998 | Michael ..................... | 382/203 |
| 5,754,679 A | 5/1998 | Koljonen et al. ........... | 382/151 |
| 5,757,956 A | 5/1998 | Koljonen et al. ........... | 382/151 |
| 5,761,326 A | 6/1998 | Brady et al. ................ | 382/103 |
| 5,768,443 A | 6/1998 | Michael et al. ............. | 382/294 |
| 5,793,899 A | 8/1998 | Wolff et al. ................. | 382/260 |
| 5,796,386 A | 8/1998 | Lipscomb et al. .......... | 345/156 |
| 5,796,868 A | 8/1998 | Dutta-Choudhury ........ | 284/199 |
| 5,801,966 A | 9/1998 | Ohashi ....................... | 702/152 |
| 5,805,722 A | 9/1998 | Cullen et al. ............... | 382/146 |
| 5,809,658 A | 9/1998 | Jackson et al. ............... | 33/288 |
| 5,818,443 A | 10/1998 | Schott ........................ | 382/141 |
| 5,825,483 A | 10/1998 | Michael et al. .......... | 356/243.1 |
| 5,825,913 A | 10/1998 | Rostami et al. ............. | 382/151 |
| 5,835,099 A * | 11/1998 | Marimont ................... | 345/431 |
| 5,835,622 A | 11/1998 | Koljonen et al. ........... | 382/146 |
| 5,845,007 A | 12/1998 | Ohashi et al. .............. | 382/199 |
| 5,847,714 A * | 12/1998 | Naqvi et al. ................ | 345/439 |
| 5,848,189 A | 12/1998 | Pearson et al. ............. | 382/218 |
| 5,850,466 A | 12/1998 | Schott ........................ | 382/141 |
| 5,859,923 A | 1/1999 | Petry, III et al. ........... | 382/141 |
| 5,861,909 A | 1/1999 | Garakani et al. ............. | 348/87 |
| 5,872,870 A | 2/1999 | Michael ..................... | 382/291 |
| 5,878,152 A | 3/1999 | Sussman .................... | 382/106 |
| 5,900,975 A | 5/1999 | Sussman .................... | 359/493 |
| 5,901,241 A | 5/1999 | Koljonen et al. ........... | 382/150 |
| 5,909,504 A | 6/1999 | Whitman .................... | 382/141 |
| 5,912,768 A | 6/1999 | Sissom et al. .............. | 359/629 |
| 5,912,984 A | 6/1999 | Michael et al. ............. | 382/149 |
| 5,918,196 A | 6/1999 | Jacobson .................... | 702/97 |
| 5,933,523 A | 8/1999 | Drisko et al. ............... | 382/151 |
| 5,943,441 A | 8/1999 | Michael ...................... | 382/199 |
| 6,002,738 A * | 12/1999 | Cabral et al. .................. | 378/4 |
| 6,016,152 A * | 1/2000 | Dickie ........................ | 345/436 |
| 6,069,668 A * | 5/2000 | Woodham, Jr. et al. .... | 348/578 |

OTHER PUBLICATIONS

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing For Cost Sensitive Applications," 4 pp. (1993).

PictureTel Corporation Product Brochure, "Picturetel System 4000(tm) A Family of Models To Fit Your Application From Offices To Boardrooms, Classrooms, and Auditoriums," 4 pp. (1993).

Symantec Corporation,; "The Norton pcAnywhere User's Guide," Table of Contents 8 pp Introduction of pcAnywhere Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipeland Processor, Product Information Brochure, pp. 2–169–2–211.

Horn, Berthold Klaus Paul. "Robert Vision", The Massachusetts Institute for Technology, 1986.

Racca Roberto G., Stephenson Owen, and Clements Reginald M. High–speed video analysis system using multiple shuttered charge–coupled device imagers and digital storage. Optical Engineering (Jun. 1992) 31;6.

Gevorkian David Z., Astola Jaakko T., and Atourian Samvel M. "Improving Gil–Werman Algorithm for Running Min and Max Filters" IEEE Transactions on Pattern Analysis and Machine Intelligence, vol. 19, No. 5, May 1997, pp. 526–529.

Gil, Joseph and Werman Michael. "Computing 2–D Min, Median, and Max Filters" IEEE Transactions on Pattern Analysis and Machine Intelligence, vol. 15, No. 5, May 1993, pp. 504–507.

Chapter 3: "Guidelines for Developing MMX Code," Intel.

Chapter 4: "MMX Code Development Strategy," Intel.

Chapter 5: "MMX Coding Techniques," Intel.

Chapter 3: "Optimization Techniques for Integer Blended Code," Intel.

Rosenfeld, Azriel. "Computer Vision: Basic Principles," Proceedings of the IEEE. vol. 76, No. 8, Aug. 1988. pp. 863–868.

* cited by examiner

METHODS AND APPARATUS FOR GENERATING A PROJECTION OF AN IMAGE

This application is a continuation-in-part of U.S. patent application Ser. No. 09/027,432, filed Feb. 20, 1998.

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to image processing and, more particularly, to methods and apparatus for generating a projection of an image.

Image processing refers to the automated analysis of images to determine the characteristics of features shown in them. It is used, for example, in automated manufacturing lines, where images of parts are analyzed to determine placement and alignment prior to assembly. It is also used in quality assurance where images of packages are analyzed to insure that product labels, lot numbers, "freshness" dates, and the like, are properly positioned and legible.

Image processing has non-industrial applications, as well. In biotechnology research, it can be used to identify constituents of microscopically imaged samples, or growth patterns in culture media. On the macroscopic scale, it can be used in astronomical research to find objects in time-lapse images. Meteorologic, agricultural and defense applications of image processing include the detection and analysis of objects in satellite images.

In applications where speed counts, image processing systems typically do not analyze every feature in an image but, rather, infer most from analysis of a significant few.

Thus, for example, the position and orientation of semiconductor chip can usually be inferred from the location and angle of one of its edges. Likewise, the center of an object can often be estimated from the positions of its edges.

One image processing technique for discerning salient features in an image is projection. Though a similarly named technique is commonly used in the visual arts to add depth to paintings and drawings, the image processing counterpart is used to reduce complexity and, thereby, to reduce the computational resources necessary an image. More particularly, image processing projections reduce the dimensions of an image while maintaining relative spacing among features along axes of interest.

In machine vision, the most common form of projection involves reducing an image from two dimensions to one. A projection taken along the x-axis, for example, compresses all features in the y-dimension and, therefore, facilitates finding their positions along the x-axis. Thus, it can be used to find rapidly the width of an imaged object. A projection along the y-axis, on the other hand, speeds finding the height or vertical extent of an object.

These types of projections are typically made by summing the intensities of pixels at each point along the respective axis. For example, the projection of an image along the x-axis is made by summing the intensities of all pixels whose x-axis coordinate is zero; then summing those whose x-axis coordinate is one; those whose x-axis coordinate is two; and so forth. From those sums can be inferred the x-axis locations of significant features, such as edges.

In many instances, it is desirable to project images along arbitrary axes, not merely the pixel grid defined by the x- and y-axes. For example, if a semiconductor chip is not aligned with the x- and y-axes of the video camera which images of it, the locations of the chip leads can best be determined by generating a projection along an axis of the chip itself—not the axis of the camera.

The prior art offers two principal solutions: one that operates quickly, but with low accuracy; the other, that operates more slowly, but with greater accuracy. The former involves summing the intensities of pixels falling between parallel lines normal to the angle of the projection and spaced in accord with the projection bin width. The sum of intensities formed between each pair of neighboring lines is stored in a corresponding projection bin. Though such techniques can be employed in tools that operate sufficiently quickly to permit their use in real time, their accuracy is typically too low for many applications.

The other prior art solution is to transform the image prior to taking its projection. One common transformation tool used for this purpose is referred to as affine transformation, which resizes, translates, rotates, skews and otherwise transforms an image. Conventional affine transformation techniques are typically slow and too computationally intensive for use in real-time applications. Specifically, the prior art suggests that affine transforms can be accomplished by mapping a source image into a destination image in a single pass. For every pixel location in the destination image, a corresponding location in the source image is identified. In a simplistic example, every pixel coordinate position in the destination image maps directly to an existing pixel in the source. Thus, for example, the pixel at coordinate (4,10) in the source maps to coordinate (2,5) in the destination; the pixel at (6,10) in the source, to (3,5) in the destination; and so on.

However, rarely do pixels in the source image map directly to pixel positions in the destination image. Thus, for example, a pixel at coordinate (4,10) in the source may map to a location (2.5, 5.33) in the destination. This can be problematic insofar as it requires interpolation to determine appropriate pixel intensities for the mapped coordinates. In the example, an appropriate intensity might be determined as a weighted average of the intensities for the source pixel locations (2,5), (3,5), (2,6), and (3,6).

The interpolation of thousands of such points consumes both time and processor resources. Conventional affine transform tools must typically examine at least four points in the source image to generate each point in the destination image. This is compounded for higher-order transformations, which can require examination of many more points for each interpolation.

Although prior art has suggested the use of multiple passes (i.e., so-called separable techniques) in performing specific transformations, such as rotation, no suggestion is made as to how this might be applied to general affine transforms, e.g., involving simultaneous rotation, scaling, and skew.

An object of this invention is to provide improved systems for image processing and, more particularly, improved methods and apparatus for image projection.

A more particular object is to provide such methods and apparatus as facilitate generating projections of images (or objects) that have been rotated, skewed, scaled, sheared, transposed or otherwise transformed.

Another object of the invention is to provide such methods and apparatus as permit rapid analysis of images, without undue consumption of resources.

Still another object of the invention is to provide such methods and apparatus as are readily adapted to implementation conventional digital data processing apparatus, e.g., such as those equipped with commercially available superscalar processors—such as the Intel Pentium MMX or Texas Instruments C80 microprocessors.

SUMMARY OF THE INVENTION

The foregoing objects are among those attained by the invention, which provides methods and apparatus for generating projections while concurrently rotating, scaling, translating, skewing, shearing, or subjecting the image to other affine transforms. In an exemplary aspect, the invention provides methods for generating a projection of an image by generating an "intermediate" image via a one-dimensional affine transformation of the source along a first axis, e.g., the y-axis. The intermediate image is subjected to a second one-dimensional affine transformation along a second axis, e.g., the x-axis. The resultant image is then projected along a selected one of these axes.

According to related aspects of the invention, there are provided methods as described above in which the first one-dimensional transformation determines a mapping between coordinates in the intermediate image and those in the source image. Preferably, the coordinates in the intermediate image lie at integer coordinate positions, e.g., coordinate positions such as at (1, 1), (1, 2), and so forth. Though the mapped locations in the source image do not necessarily lie at integer coordinate positions, they advantageously include at least one integer coordinate, e.g., coordinate positions such as (1, 1.5), (2, 4.25), (3, 3.75), and so forth.

Once the mappings of the first one-dimensional transformation are determined (or after each one has been determined), the method determines an intensity value for the pixel at each coordinate in the intermediate image. This is done by interpolating among the intensities of the pixels in the region neighboring the corresponding or mapped coordinate in the source image. Because the coordinate locations in the intermediate image are generated in sequences along a first axis, and because the mapped locations have at least one integer coordinate, interpolations are greatly simplified.

With the second one-dimensional transformation, the method similarly determines a mapping between pixel coordinates in a destination image and those of the intermediate image. This transformation proceeds as described above, albeit with sequences of coordinate locations that vary along the second axis.

Once the second transformation is completed, a projection of the resultant image is taken along the first or second axes by summing the intensities of pixels (or counting pixels with intensities above a threshold) in each column or row along that axis.

According to further aspects of the invention, the two one-dimensional affine transformation, together, effect a general affine transformation of the type described by the mathematical relation:

$$\begin{bmatrix} x_s \\ y_s \end{bmatrix} = M \cdot \begin{bmatrix} x_d \\ y_d \end{bmatrix} + \begin{bmatrix} x_o \\ y_o \end{bmatrix}$$

$$M = \begin{bmatrix} e_{11} & e_{12} \\ e_{21} & e_{22} \end{bmatrix}$$

where ($x_d$, $y_d$) represents a coordinate in the destination image;

($x_s$, $y_s$) represents a coordinate in the source image;

($x_o$, $y_o$) is an offset to be effected by the transformation; and

M is a transformation matrix.

According to further aspects of the invention, the transformation matrix M is decomposed into left and right triangular matrices (otherwise referred to as upper and lower matrices, U and L, respectively) in accord with the following mathematical relation:

$$\begin{bmatrix} e_{11} & e_{12} \\ e_{21} & e_{22} \end{bmatrix} = \begin{bmatrix} l_{11} & 0 \\ l_{21} & l_{22} \end{bmatrix} \cdot \begin{bmatrix} u_{11} & u_{12} \\ 0 & u_{22} \end{bmatrix}$$

In a related aspect of the invention, the matrix elements $l_{11}$ and $u_{22}$ are set to integers, and, preferably, are set to one.

In accordance with related aspects of the invention, a method as described above performs the first transformation, or first "pass," in accord with the mathematical relation:

$$\begin{bmatrix} x_s \\ y_s \end{bmatrix} = \begin{bmatrix} u_{11} & u_{12} \\ 0 & u_{22} \end{bmatrix} \begin{bmatrix} x_t \\ y_t \end{bmatrix} + \begin{bmatrix} INT(x_0) \\ y_0 \end{bmatrix}$$

where ($x_s$, $y_s$) is a coordinate in the source image;

($x_t$, $y_t$) is a coordinate in the intermediate image;

($x_o$, $y_o$) is a translational offset to be effected by the transformation;

$INT(x_o)$ is the integer component of $x_o$; and $\begin{bmatrix} u_{11} & u_{12} \\ 0 & u_{22} \end{bmatrix}$ is the upper partial transformation matrix attained by decomposition of the transformation matrix $M$.

is the upper partial transformation matrix attained by decomposition of the transformation matrix M.

In a related aspect, the second partial transformation, or second "pass," is effected in accord with the mathematical relation:

$$\begin{bmatrix} x_t \\ y_t \end{bmatrix} = \begin{bmatrix} l_{11} & 0 \\ l_{21} & l_{22} \end{bmatrix} \begin{bmatrix} x_d \\ y_d \end{bmatrix} + \begin{bmatrix} FRAC\ (x_0) \\ 0 \end{bmatrix}$$

where ($x_t$, $y_t$) is a coordinate in the intermediate image;

($x_d$, $y_d$) is a coordinate in the destination image;

($X_o$) is the x-axis component of the offset to be effected by the transformation;

FRAC($x_o$) is the fractional component of $x_o$; and $\begin{bmatrix} l_{11} & 0 \\ l_{12} & l_{22} \end{bmatrix}$ is a lower partial transformation matrix attained by decomposition of the transformation matrix $M$.

is a lower partial transformation matrix attained by decomposition of the transformation matrix M.

Still further aspects of the invention provide methods as described above in which the mappings between pixel coordinates in the source and intermediate images are determined iteratively. Thus, for example, once a mapping has been determined for one coordinate in the intermediate image, a mapping for the next coordinate is obtained as a function (e.g., summation) of the prior mapping. For example, on determining the x-axis coordinate of a coordinate in the source image that maps to a coordinate in the intermediate image, the x-axis coordinate that maps to the adjacent coordinate in the intermediate image may be obtained using the relation:

$$x_s[i+1, j] = x_s[i, j] + 1$$

where $x_s[i, j]$ is the x-axis coordinate of a location in the source image that maps to coordinate (i, j) in the intermediate image;

$x_s[i+1, j]$ is the x-axis coordinate of the location in the source image that maps to coordinate (i+1, j) in the intermediate image.

Likewise, the y-axis coordinate of a location in the source image can be determined iteratively in accord with the following relation:

$$y_s[i+1, j] = y_s[i, j] + l_{21}$$

where $y_s[i, j]$ is the y-axis coordinate of a location in the source image that maps to coordinate (i, j) in the intermediate image;

$y_s[i+1, j]$ is the y-axis coordinate of the location in the source image that maps to coordinate (i+1, j) in the intermediate image;

$l_{21}$ is a parameter from the lower partial transformation matrix, as described above.

In a related aspect, the invention provides methods as described above in which the mapping between coordinates in the intermediate image and the destination image are determined in accord with the iterative relations:

$$x_i[i+1, j] = x_i[i, j] + u_{11}$$

$$y_i[i+1, j] = y_i[i, j] + 1$$

where $x_i[i, j]$ is the x-axis coordinate of a location in the intermediate image that maps to coordinate (i, j) in the destination image;

$x_i[i+1, j]$ is the x-axis coordinate of a location in the intermediate image that maps to coordinate (i+1, j) in the destination image;

$y_i[i, j]$ is the y-axis coordinate of a location in the intermediate image that maps to coordinate (i, j) in the destination image;

$y_i[i+1, j]$ is the y-axis coordinate of a location in the intermediate image that maps to coordinate (i+1, j) in the destination image.

Still further aspects of the invention provide methods as described above in which the first partial transformation determines mappings between the intermediate and source images for only those coordinates in the intermediate image that will ultimately be mapped into the destination image. Put another way, rather than mapping the entire region of the source image that lies within the bounding box enclosing the intermediate affine "rectangle," methods according to this aspect of the invention map only those portions that lie within the destination image.

Rather than determining a source-to-intermediate mapping for each pixel coordinate in a row of the intermediate image, a method according to this aspect of the invention can limit those determinations to the region in each row that is offset from the prior row by an amount $u_{12}$, which is a parameter of the upper partial transformation matrix as defined above.

More particularly, having determined the x-axis coordinate of a location in the source image that maps to the first element (0, j) in a row of the intermediate image, a method according to this aspect of the invention can determine the x-axis coordinate of a location in the source image that maps to the first element (0, j+1) in the next row of the intermediate image in accord with the relation:

$$x_s[0, j+1] = x_s[0, j] + u_{12}$$

Still further aspects of the invention provide methods as described above utilizing modified forms of the foregoing mathematical relations in order to effect projections where the underlying affine transforms are for angles outside the range −45° −45°.

Yet still other aspects of the invention provide digital data processing apparatus, e.g., machine vision systems operating in accord with the above-described methodologies.

Those and other aspects of the invention are evident in the drawings and in the description that follows.

Methods and apparatus according to the invention have many advantages over prior art projection techniques. At the outset, they permit projections to be taken at any angle, skew, scaling, translation or other affine transform without undue consumption of resources and with speeds suitable for real-time applications. For example, by performing a two-pass affine transform as described above and, then, projecting the image along one of the axes, no complex or special purpose techniques are necessary to sum the pixel intensities.

Moreover, the unique two-pass affine transformation is, itself, superior to prior art affine techniques. For example, in the case of bilinear transformations, the two-pass transformation demands fewer pipeline stages to resolve data dependicies during interpolation—and, therefore, permits better utilization of superscalar processor execution units. In addition, that transformation permits processor registers to be used more efficiently, e.g., because linear interpolations require fewer computations than bilinear interpolations. In the case of higher-order interpolations, the two-pass transformation demands fewer operations. Particularly, the number of operations required by the prior art is proportional to $n^2$, where (n) is the order of interpolation. The number of operations required by the invention, on the other hand, is proportional to 2 n.

The two-pass affine transformation utilized by the invention has other advantages over the prior art. Specifically, although separable transformation techniques are known, they cannot be applied to general affine transformation but, only to individual transformations, e.g., rotation-only, scaling-only, etc. Thus, for example, in order to rotate, scale and skew an image using these prior art techniques, it is necessary to do three separate transformations (each requiring at least two passes). The affine transformation utilized by the invention permits this to be accomplished and in a single, two-part act.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
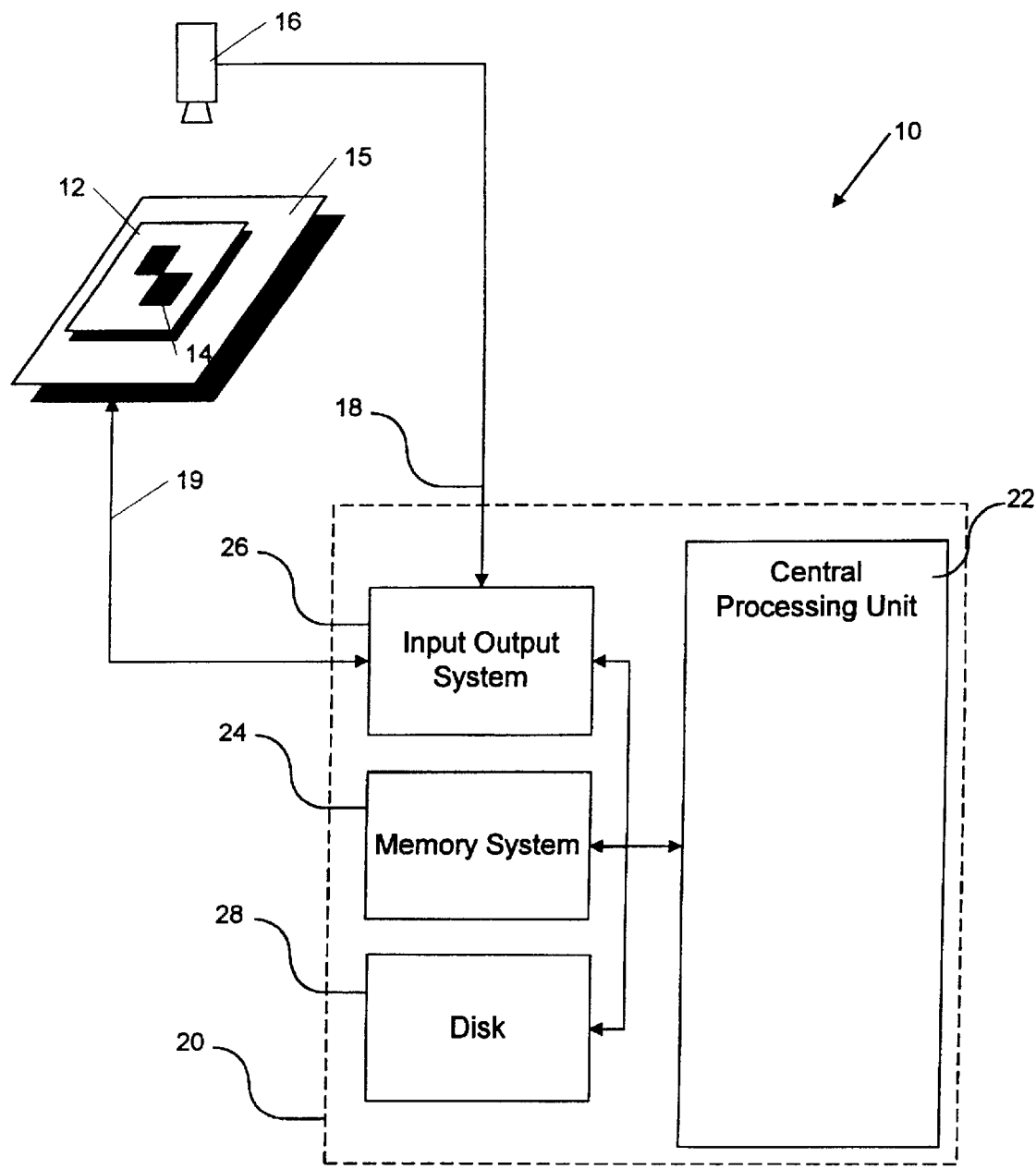
FIG. 1 depicts a digital data processing system for generating projections according to the invention.

FIG. 1 depicts a machine vision system 10 according to the invention for generating a projection of a source image. The system 10 includes an image capture device, e.g., camera 16, that generates an image of a scene including object 12. Digital image data (or pixels) generated by the capturing device 16 represents, in the conventional manner, the image intensity (e.g., contrast color, brightness) of each point in the field of view of the capturing device. The image acquisition device may be video camera, charge coupled display (CCD) device, or any other device suitable for imaging device object 12. In the illustration, the object 12 is disposed on a platform 15 capable of translating and rotating the object, e.g., based on information determined by image analysis system 20 in connection with the techniques described herein.

Digital image data is transmitted from capturing device 16 via a communications path 18 to the image analysis system 20. This can be a conventional digital data processor, or a vision processing system of the type commercially available from the assignee hereof, Cognex Corporation, as programmed in accord with the teachings hereof to rotate, scale and translate an image acquired by device 16. The image analysis system 20 may have one or more central processing units 22, main memory 24, input-output system 26, and disk drive (or other mass storage device) 28, all of the conventional type. A preferred central processing unit for use in carrying out methods according to the invention has a superscalar instruction set, e.g., those of the Intel MMX or Texas Instruments C80 processors.

The system 20 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

Figure 2:
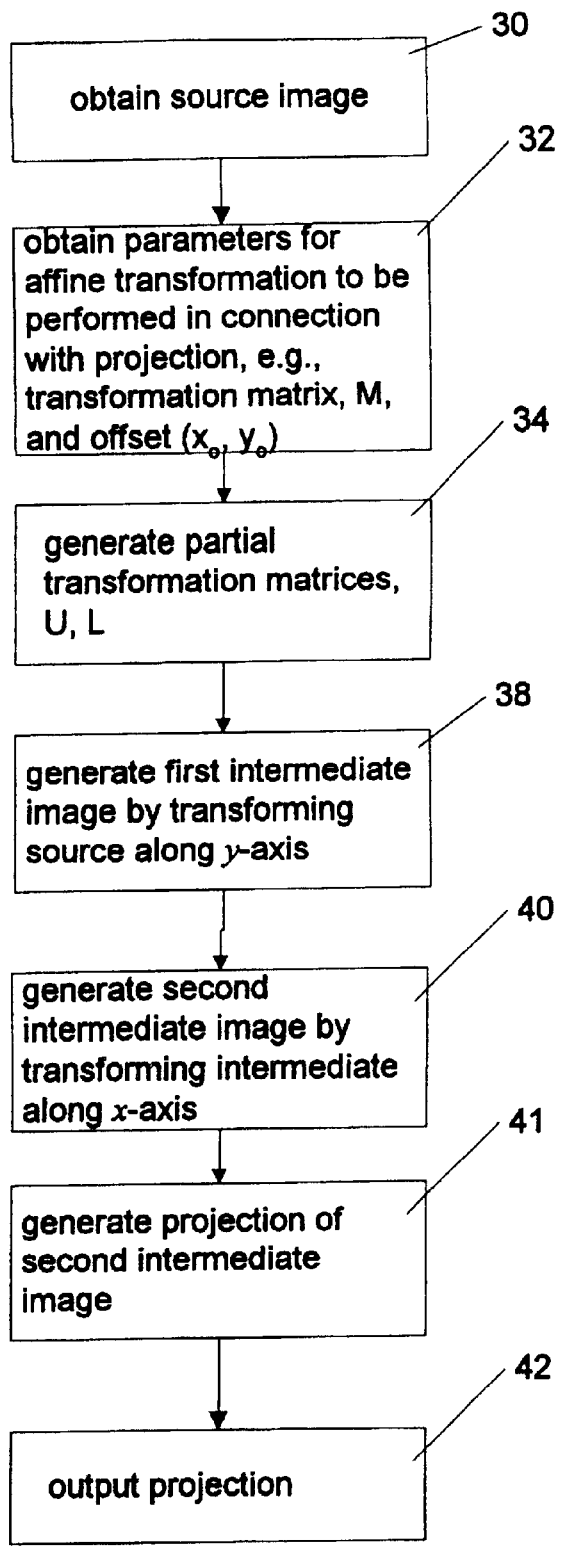
FIG. 2 depicts a method according to the invention for generating projections.

FIG. 2 depicts a method according to the invention for generating projections. Though that methodology and the discussion that follows is applicable to all practices of the invention, it is preferably applied to those where affine transformations underlying the projections involve rotations between −45° and 45°. Variants may be employed where the rotation angle falls outside that range. Those variants are discussed below.

Referring to step 30, the method obtains a source image for which a projection is to be generated. This can be acquired by image capture device 16, generated by central processing unit 22, or otherwise generated or made available for processing by image analysis system 20. The source image is preferably in digital format, i.e., comprised of pixels representing intensities (e.g., color, brightness or contrast) of corresponding portions of a scene.

In step 32, the method obtains parameters defining the general affine transformation to be effected in connection with the projection. In the illustrated embodiment, those parameters are provided in the form of a transformation matrix, M, of the form $$\begin{bmatrix} e_{11} & e_{12} \\ e_{21} & e_{22} \end{bmatrix}$$

that is supplied as a parameter to a function or subroutine executing on central processing units 22 that carry out the illustrated method. The matrix, and other parameters, may be supplied by a user, pre-programmed into the image analysis system 20, or otherwise obtained in a conventional manner. In step 32, the method also obtains an offset, $x_o$, $y_o$ to be used in connection with the affine transform.

The affine transformation utilized with the illustrated embodiment is generally accomplished by mapping source image coordinates to destination image coordinates and, based on those mappings, interpolating among source image pixel intensities to estimate appropriate densities for the destination image. This can be expressed mathematically as follows:

$$\begin{bmatrix} x_s \\ y_s \end{bmatrix} = M \cdot \begin{bmatrix} x_d \\ y_d \end{bmatrix} + \begin{bmatrix} x_o \\ y_o \end{bmatrix}$$

where ($x_s$, $y_s$) is a coordinate in the source image;

($x_d$, $y_d$) is a coordinate in the destination image;

($x_o$, $y_o$) is an offset defining the extent to which the source image is to be translated; and M is the aforementioned transformation matrix, defining the extent to which the source image is to be rotated, scaled, skewed or otherwise transformed by the transformation.

In step 34, the method generates partial transformation matrices from the transformation matrix M. These partial transformation matrices are triangular matrices whose multiplicative product is equal to the matrix M. In the illustrated embodiment, these partial transformation matrices are represented by L and U, as follows $$M = L \cdot U$$

$$M = L \cdot U$$
$$= \begin{bmatrix} l_{11} & 0 \\ l_{21} & l_{22} \end{bmatrix} \cdot \begin{bmatrix} u_{11} & u_{12} \\ 0 & u_{22} \end{bmatrix}$$

In the illustrated embodiment, the elements of partial transformation matrices L, U are generated in accord with the following mathematical relations:

$l_{11}*u_{11}=e_{11}$ $l_{21}=l_{11}*(e_{21}/e_{11})$ $l_{22}*u_{22}=det(M)/e_{11}$ $u_{12}=u_{11}*(e_{12}/e_{11})$ where det(M) is the determinant of transformation matrix (M).

In preferred embodiments, as illustrated in the steps that follow, elements $l_{11}$ and $u_{22}$ are set to integers and, preferably, to one.

In step 38, the method generates a first intermediate image—also referred to, simply, as the "intermediate" image—by affine transformation of the source image along a single axis, to wit, the y-axis, using the partial transformation matrix L, preferably, in accord with the relations:

$$\begin{bmatrix} x_s \\ y_s \end{bmatrix} = L \begin{bmatrix} x_t \\ y_t \end{bmatrix} + \begin{bmatrix} INT\ (x_0) \\ y_0 \end{bmatrix}$$

$$= \begin{bmatrix} 1 & 0 \\ l_{21} & l_{22} \end{bmatrix} \begin{bmatrix} x_t \\ y_t \end{bmatrix} + \begin{bmatrix} INT\ (x_0) \\ y_0 \end{bmatrix}$$

This "first pass" can be better understood by expanding the foregoing relations. With respect to the x-axis, $x_s$ varies directly with $x_t$, as shown below:

$x_s = x_t + INT(x_o)$

By utilizing only the integer component of the offset $x_o$, and given that $x_t$ itself takes on only integer values during generation of the intermediate image, the method insures that no interpolation is required in the x-dimension.

Whereas $x_s$ is constrained to integer values during generation of the intermediate image, $y_s$ is not. By expanding the foregoing matrix relation, it is seen that $y_s = l_{21}x_t + l_{22}y_t + y_o$ Since $l_{21}$, $l_{22}$ and $y_o$ are not necessarily integers, $y_s$ (which corresponds to integer $y_t$) is typically non-integer.

As seen above, the illustrated method defines source-to-intermediate mappings in which fractional components appear only in y-axis component—i.e., along the axis of the partial transformation. This is advantageous since it avoids the need to perform interpolations in two-dimensions (e.g., bicubic interpolations) in order to determine pixel intensities for intermediate image.

In step 40, the illustrated method generates a second intermediate—also referred to as the destination image— image by affine transformation of the first intermediate image along the other axis, i.e., the x-axis. The mapping for this transformation utilizes the partial transformation matrix, U, in accord with the relation:

$$\begin{bmatrix} x_t \\ y_t \end{bmatrix} = U \begin{bmatrix} x_d \\ y_d \end{bmatrix} + \begin{bmatrix} FRAC\ (x_0) \\ 0 \end{bmatrix}$$

$$= \begin{bmatrix} u_{11} & u_{12} \\ 0 & 1 \end{bmatrix} \begin{bmatrix} x_d \\ y_d \end{bmatrix} + \begin{bmatrix} FRAC\ (x_0) \\ 0 \end{bmatrix}$$

As above, transformation along the x-axis utilizing of this relation constrains values of $y_t$ to integers, while permitting $x_t$ to take on fractional components. Particularly, expanding the foregoing reveals the following relations:

$x_t = u_{11}x_d + u_{12}y_d + FRAC(x_o)$ $y_t = y_d$

In step 41, the method generates a projection of the second intermediate image along its x-axis. According to one practice of the invention, this is done by summing the intensities of the pixels in each column along that axis, e.g., the intensities for the pixels whose x-axis coordinate is zero; the pixels whose x-axis coordinate is 0+Δ, the pixels whose x-axis coordinate in 0+2Δ, and so forth; where Δ represents the pixel width of the image. More generally, the columns are of a predetermined width, or bin width. The projection thus made by summing the intensities of pixels in respective successive columns of that width along the axis.

Other known techniques for taking a projection along an axis may be utilized in step 41 as well. For example, rather than summing the intensities of the pixels, the count of pixels whose intensities are above a predetermined threshold can be summed.

Of course, the projection taken in step 41 may be along the y-axis instead of the x-axis. In this case, the pixels intensities or counts are summed along rows instead of columns.

In step 42, the method outputs the projection results, e.g., for use by the operator or for transfer and further processing by other machine vision tools. Those results are preferably contained in an array of the sums formed in step 41.

Figure 3:
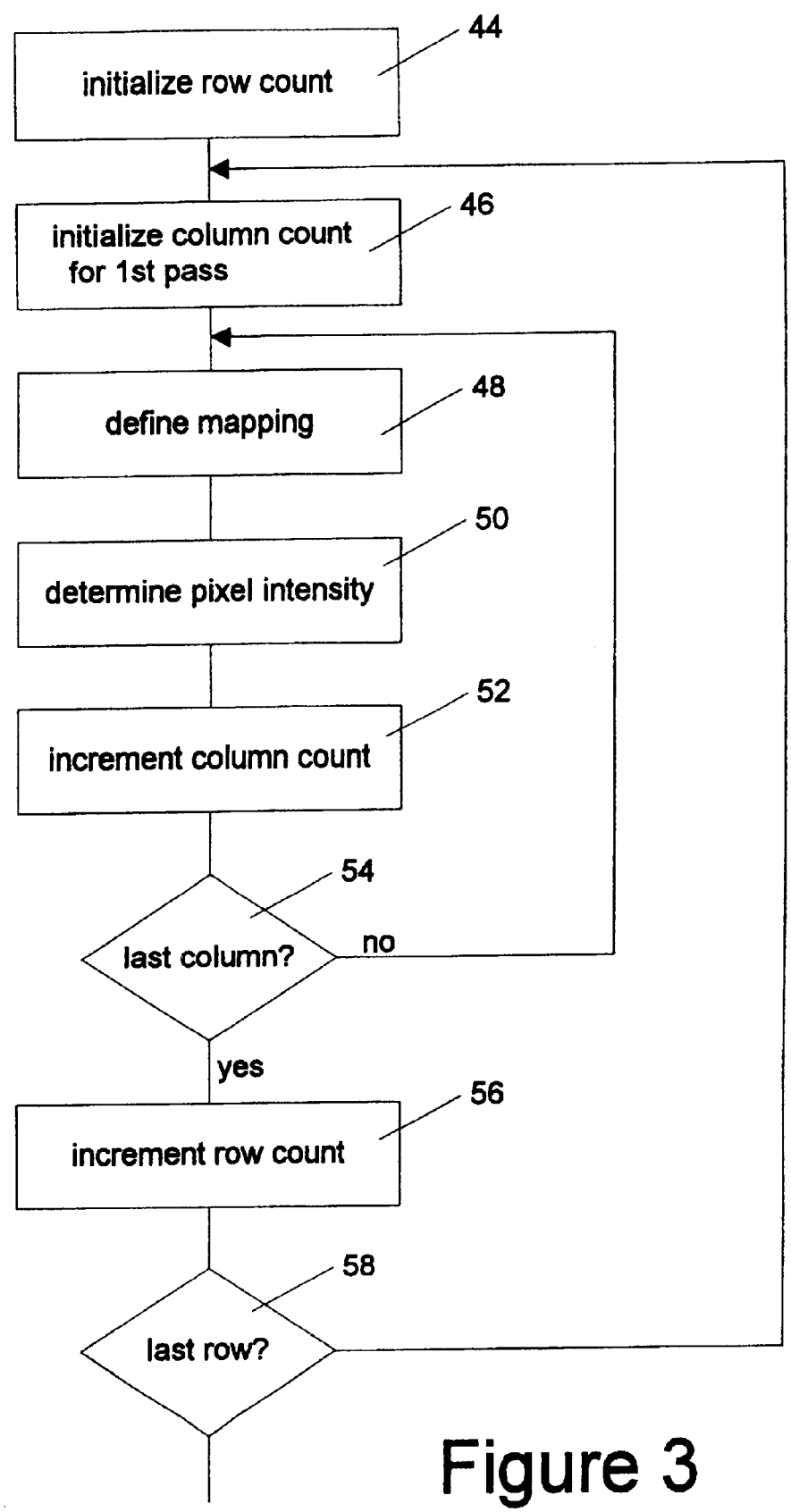
FIG. 3 depicts steps for effecting a single pass of an affine transformation in a method according to the invention.

FIG. 3 depicts a preferred method according to the invention for generating an intermediate image via a one-dimensional affine transformation of the source image. The illustrated method relies on iterative techniques to generate the source-to-intermediate mappings. Though use of such techniques speed processing in conventional digital data processors, those skilled in the art will appreciate that other techniques can be employed to generate such mappings, as well.

In step 44, the method initializes the intermediate image row count, (j). Preferably, this value is set to zero, as a preferred practice of the invention creates the intermediate image beginning at the coordinate location (0, 0). Those skilled in the art will, of course, appreciate that other starting coordinates for the row can be used as well.

In step 46, the method initializes the column count (i) for the current row. According to a preferred practice of the invention, this value is set at zero for each row. In a preferred embodiment, however, the method utilizes an offset that is a function of the current row number and of the transformation parameters. Use of this offset, referred to as ROWSHIFT, avoids the need to determine mapping (and pixel intensities) for portions of the intermediate image that will not be necessary for generation of the destination image. In a preferred embodiment, this offset is determined in accord with the relation:

ROWSHIFT[j]=INT($u_{11}$·j)

Other embodiments may compute this offset in accord with other relations, or use no offset at all.

In step 48, the method maps a source pixel coordinate to the current intermediate pixel coordinate (i, j). This mapping can be determined iteratively, once the mapping for intermediate pixel (0, 0) has been determined (e.g., during initialization) in accord with the relations:

$x_s[0, 0] = x_t[0, 0] + INT(x_o)$ $= 0 + INT(x_o)$ $= INT(x_o)$ $$y_s[0, 0]=l_{21}x_t[0, 0]+l_{22}y_t[0, 0]+(y_o)$$

$$=l_{21}*0+l_{22}*0+(y_o)$$

$$=(y_o)$$

Once a first source-to-intermediate mapping has been determined, e.g., for intermediate coordinate (0, 0), step 48 determines further mappings for the same row (j) iteratively, in accord with the relations:

$$x_s[i+1,j]=x_s[i, j]+1$$

$$y_s[i+1,j]=y_s[i, j]+l_{21}$$

Moreover, mappings for successive rows of the destination image can be determined iteratively as well. Thus, for example, the source coordinate that maps to the first element of such rows can be determined in accord with the relation:

$$x_s[0, j+1]=x_s[0, j]+\text{ROWSHIFT}[j]$$

$$y_s[0, j+1]=y_s[0, j]+l_{21}*\text{ROWSHIFT}[j]$$

Once a pixel coordinate location (i, j) in the intermediate image has been mapped to a coordinate ($x_s[i, j]$, $y_s[i, j]$) in the source image, the method determines the pixel intensity for coordinate (i, j). This is preferably accomplished by interpolating pixel intensities in the vicinity of the corresponding source coordinates ($x_s[i, j]$, $y_s[i, j]$). Though linear interpolations are preferred for high speed, those skilled in the art will appreciate that quadratic or any other higher-order interpolations may be used for greater accuracy. Of course, for quadratic and higher-order interpolations, the iterative relationships shown herein will differ accordingly.

As noted above, an advantage of methods according to the invention is that only the y-axis component of the mapped coordinate ($x_s[i, j]$, $y_s[i, j]$) may include a fractional component. This facilitates determination of the pixel intensifies for the intermediate image since the implementation is more efficient, e.g., on superscalar processors, as discussed above.

In step 52, the method increments the column count (i) for the current row (j). This increment is usually in units of one, through other increments may be used as well. In step 54, the method determines whether the incremented count falls beyond the "useful" boundary of the intermediate image and, more particularly, in a region outside the destination affine rectangle and, therefore, that will not be necessary in generation of the destination image. In a preferred embodiment, that determination is made by comparing the incremented column count (i) with the width $W_t$ of the region of the intermediate image being transformed, where $W_t$ is computed in accord with the relation:

$$W_t=u_{11} \cdot W_d$$

If the incremented column count does not fall out of bounds, the method returns to step 48. Otherwise, it proceeds to step 56 and it increments the row count (j). In step 58, the method determines whether that count exceeds the "useful" height of the intermediate image and, more particularly, whether it falls beyond that region of the image required for generation of the destination image. That determination is made by comparing the incremented row count (j) with the height of the destination image $H_d$.

Once the first intermediate image (or a portion thereof) has been generated, the illustrated method generates the second intermediate image (also referred to as the destination image). This is preferably accomplished using the steps shown in FIG. 3 and discussed above—albeit by applying the aforesaid relationships defining intermediate-to-destination mappings.

Referring again to FIG. 3, a preferred method according to the invention generates the destination image via a one-dimensional affine transformation of the intermediate image. As above, the method preferably relies on iterative techniques to generate the intermediate-to-destination mappings, though other techniques can be employed as well.

In step 44, the method initializes the destination row count, (j), preferably, to zero. Again, those skilled in the art will appreciate that other starting coordinates for the row can be used as well.

In step 46, the method utilizes the column count (i) for the current row. Preferably, this value is set to zero, though other values may be used as well. Unlike the first pass (i.e., generation of the intermediate image), in the second pass the method does not utilize a row or column offset.

In step 48, the method maps an intermediate pixel coordinate to the current source fixed coordinate (i, j). This mapping can be determined iteratively, once the mapping for source pixel (0, 0) has been determined (e.g., during initialization) in accord with the relations:

$$x_t[0, 0] = u_{11}x_d[0, 0] + u_{12}y_d[0, 0] + FRAC(x_0)$$

$$= u_{11}*0 + u_{12}*0 + FRAC(x_0)$$

$$= FRAC(x_0)$$

$$y_t[0, 0] = y_d[0, 0]$$

$$= 0$$

Once a first intermediate-to-destination mapping has been determined, e.g., for destination coordinate (0, 0), step 48 determines further mappings for the same row (j) iteratively, in accord with the relations:

$$x_t[i+1, j]=x_t[i, j]+u_{11}$$

$$y_t[i+1, j]=y_t[i, j]$$

Moreover, mappings for successive rows of the destination image can be determined iteratively as well. Thus, for example, the intermediate coordinate that maps to the first element of such rows can be determined in accord with the relation:

$$x_t[0, j+1]=x_t[0, j]+u_{12}$$

$$y_t[0, j+1]=y_t[o, j]+1$$

Once a pixel coordinate location (i, j) in the destination image has been mapped to a coordinate ($x_t[i, j]$, $y_t[i, j]$) in the intermediate image, the method determines the pixel intensity for coordinate (i, j). This is preferably accomplished by interpolating pixel intensities in the vicinity of the corresponding intermediate coordinate ($x_t[i, j]$, $y_t[i, j]$), as discussed above.

Once again, an advantage of methods according to the invention is that only the x-axis component of the mapped coordinate ($y_t[i, j]$, $y_t[i, j]$) may include a fractional component. This facilitates determination of the pixel intensities for the intermediate image since interpolations can be determined more efficiently, e.g., on superscalar processors.

In step 52, the method increments the column count (i) for the current row (j). This increment is usually in units of one, though other increments may be used as well. In step 54, the method determines whether the incremented count falls beyond the edge of the destination image. In a preferred embodiment, that determination is made by comparing the incremented column count (i) with the width $W_d$.

If the incremented column count does not fall out of bounds, the method returns to step 48. Otherwise, it proceeds to step 56 and it increments the row count (j). In step 58, the method determines whether that count exceeds the height of the destination image. As above, that determination is made by comparing the incremented row count (j) with the expected height of the destination image $H_d$.

Figure 4:
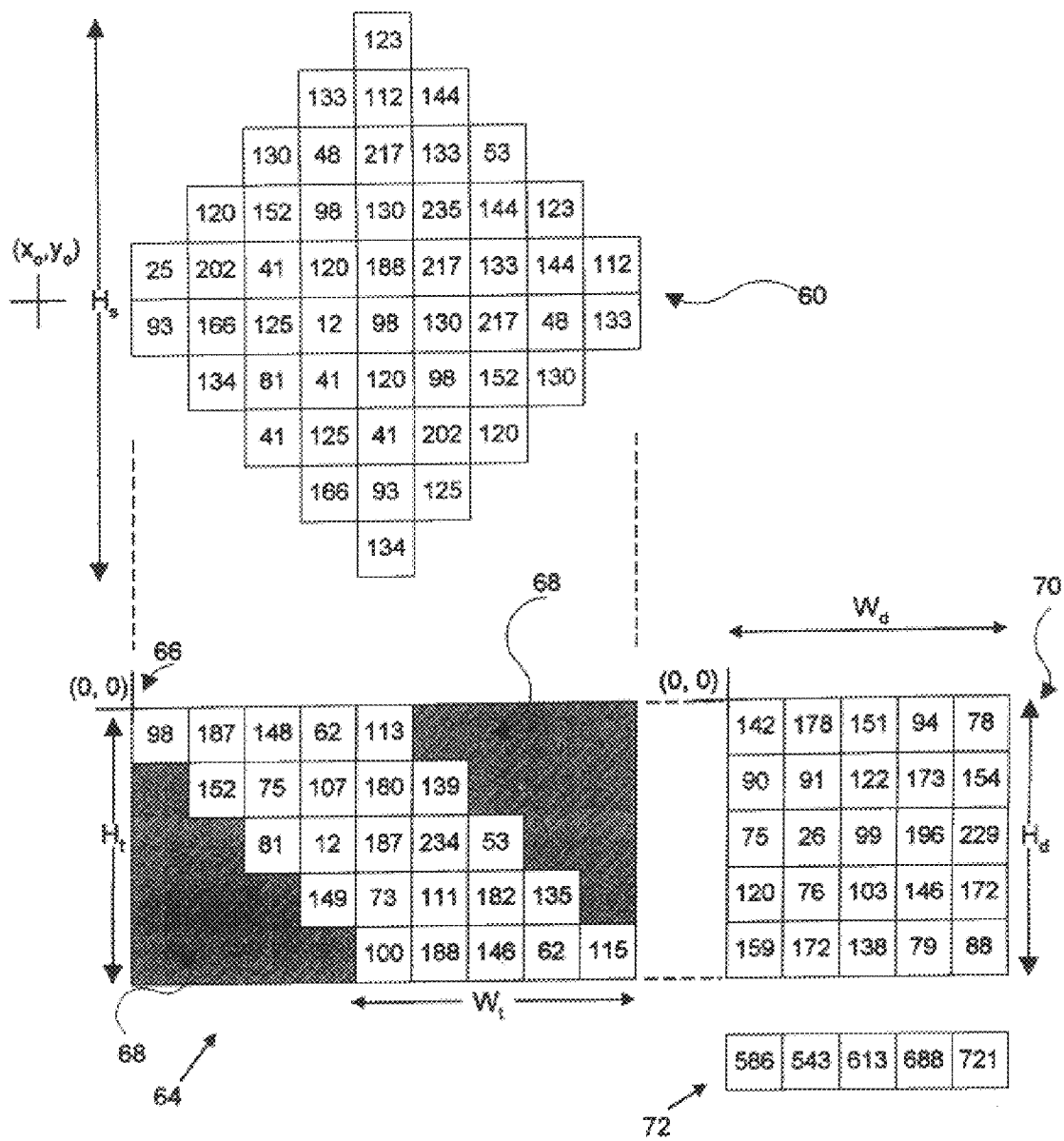
FIG. 4 graphically illustrates relationships between a source image, intermediate image, destination image and projection as generated by systems according to the invention.

FIG. 4 graphically illustrates relationships among the source, intermediate and destination images and an x-axis projection in a system according to the invention. In the drawing, the source image 60 is depicted as a diamond-shaped object. The "origin" coordinate location of the source image is marked as $(x_o, y_o)$. The height $H_s$ and width $W_s$ of a bounding box of a source affine rectangle are designated as such on the drawing.

The intermediate image generated during a first pass of steps 44–58 (FIG. 3) is shown as element 64. As a result of rotational parameters contained in the original transformation matrix M and carried forward to the partial transformation matrix L, the object shape changes. Specifically, as a result of the one-dimensional affine transformation effected by the first pass, the object takes on a stepped morphology in the intermediate image. As emphasized by the drawing (which shows no scaling component) this morphological change results purely from affine transformation along one axis—to wit the y-axis.

The width and height of the transforms partially transformed object shown in the intermediate image are designated as $W_t$ and $H_t$, respectively.

The shaded areas 68 in the intermediate image represent those portions of the image corresponding to the offset ROWOFFSET, discussed above. These represent coordinate locations in the intermediate image that are not necessary generation of the destination image, again, as discussed above.

With still further reference to FIG. 4, the second intermediate or destination image generated as a result of the second pass, utilizing steps 44–58 (FIG. 3), is marked as element 70. Here again, the shape of the object is changed—now, as a result of transformation along the x-axis. The shape of the object in the destination image is rectangular. To emphasize the one-dimensional nature of that transformation, the height $H_d$ of the destination image is shown as being identical to that of the intermediate image. Any changes in the width $W_d$ of the object is destination image result from transformation along the x-axis.

FIG. 4 further illustrates a projection array 72 generated from the second intermediate image. The elements of the illustrated array represent the sums of the intensities of the pixels in each corresponding column of the second intermediate image.

Although the methodologies discussed above permit the generation of projections utilizing all two-dimensional transformation matrices M, the mathematical relations effected by the first pass are preferably modified where the rotation angle effected by that matrix is outside the range −45° to +45°. Particularly, to avoid excessive contraction of the intermediate image (and, therefore, degradation of the destination image), where the rotation angle falls between −45° and −135°, inclusive, the rows of the M are "swapped" to produce a modified matrix M' as shown below:

$$M = \begin{bmatrix} e_{11} & e_{12} \\ e_{21} & e_{22} \end{bmatrix}$$

$$\Downarrow$$

$$M' = \begin{bmatrix} e_{21} & e_{22} \\ e_{11} & e_{12} \end{bmatrix}$$

This effects the following change in the relationship between the source and destination coordinates:

$$\begin{bmatrix} y_s \\ x_s \end{bmatrix} = \begin{bmatrix} e_{21} & e_{22} \\ e_{11} & e_{12} \end{bmatrix} \begin{bmatrix} x_d \\ y_d \end{bmatrix} + \begin{bmatrix} y_0 \\ x_0 \end{bmatrix}$$

By substitution, the relations underlying the first pass may be restated as follows:

$$\begin{bmatrix} y_s \\ x_s \end{bmatrix} = \begin{bmatrix} 1 & 0 \\ l_{21} & l_{22} \end{bmatrix} \begin{bmatrix} x_t \\ y_t \end{bmatrix} + \begin{bmatrix} y_0 \\ INT(x_0) \end{bmatrix}$$

Thus, the iterative expressions for that pass may be restated as:

$$x_s[i+1, j] = x_s[i, j] + l_{21}$$

$$y_s[i+1, j] = y_s[i, j] + srcPitch$$

where srcPitch is the "pitch" or width of the source image.

The methodology is also preferably modified where the rotation angle effected by M is between 45 and 135 degrees, or between 135 and 225 degrees. For these cases $u_{11}$ element of the right triangular matrix is negative. This leads to negative coordinates of the intermediate image. To avoid this the sign of $l_{11}$ element of the left triangular matrix is changed ($l_{11}$ is −1 now). This results in $u_{11}$ changing its sign, because $l_{11} * u_{11} = e_{11}$. As with the previous cases only $1^{st}$ pass is changed. The recursive expressions for the case when rotation angle is between 135 and 225 degrees are:

$$x_s[i+1, j] = x_s[i, j] - 1$$

$$y_s[i+1, j] = y_s[i, j] + l_{21}$$

and if rotation angle is between 45 and 135 degrees $$x_s[i+1, j] = x_s[i, j] + l_{21}$$

$$y_s[i+1, j] = y_s[i, j] - srcPitch$$

The minus sign in both cases indicates the fact that the directions of the change of corresponding coordinates are opposite for the source and intermediate images. In the second case the rows of the original transformation matrix were swapped to reduce intermediate image contraction. The fact that the second pass does not change with angle simplifies modifications (for example, projections) of the algorithm.

Figure 5:
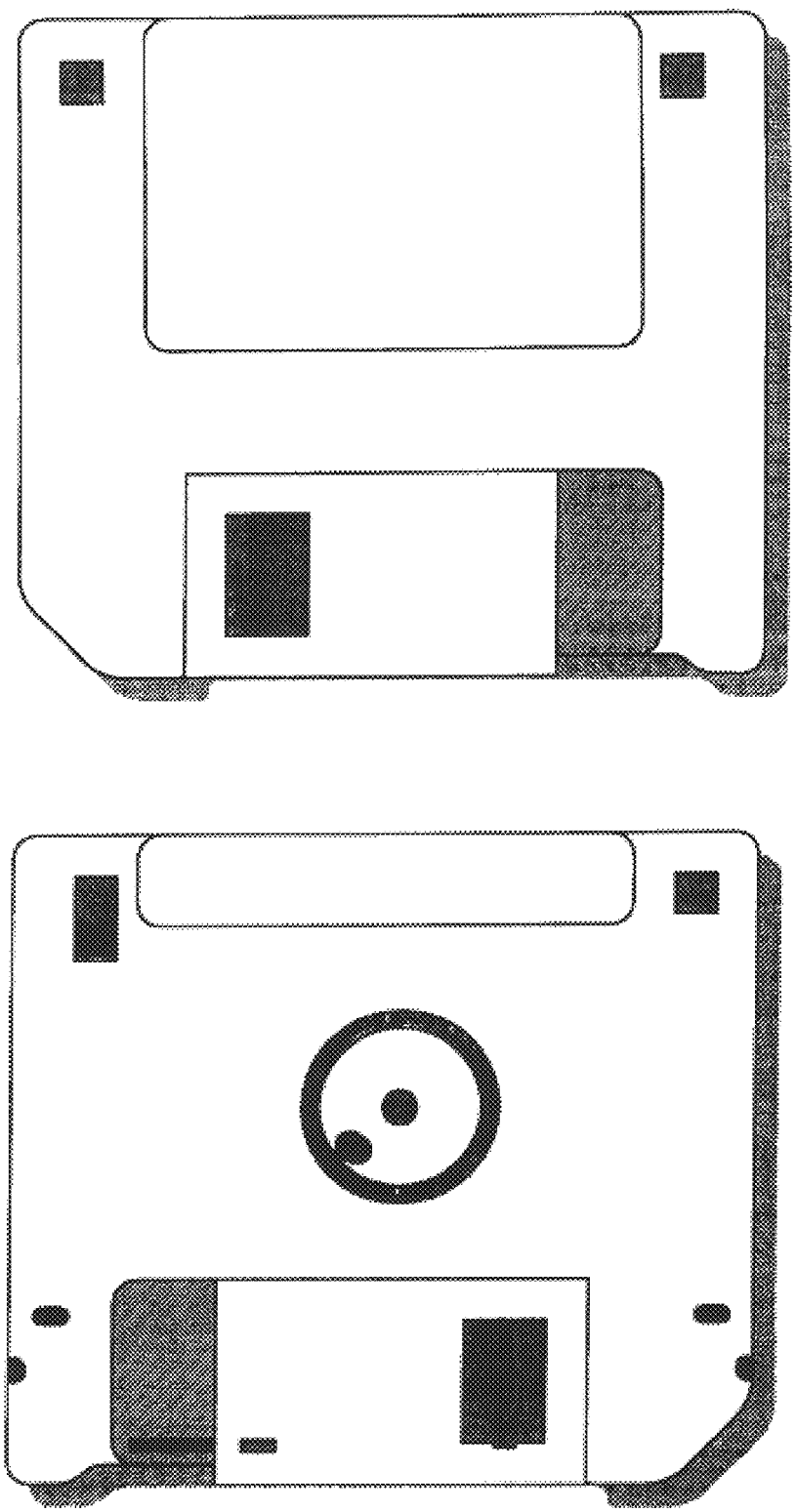
FIG. 5 depicts a computer readable medium containing programming instructions for configuring a digital data processor to practice the invention.

FIG. 5 depicts an article of manufacture, to wit, a magnetic diskette, composed of a computer usable media, to wit, a magnetic disk, embodying a computer program that causes device 20, or other such digital data processing apparatus, to operate in accord with the methods described above in connection with FIGS. 1–4. The diskette is shown in front view and back view. It is of conventional construction and has the computer program stored on the magnetic media therein in a conventional manner readable, e.g., via a read/ write head contained in a diskette drive 28 of apparatus 20. It will be appreciated that diskette is shown by way of example only and that other articles of manufacture comprising computer usable media on which programs intended to cause a computer to execute in accord with the teachings hereof are also embraced by the invention.

Described above are methods and apparatus that achieve the objects set forth above. Those skilled in the art will appreciate that the illustrated embodiments are shown as examples and that other embodiments incorporating changes therein fall within the scope of the invention. Thus, for example, it will be appreciated that the invention has application in all aspects of image processing, e.g., machine vision, medical imaging, digital photography and so forth.

In view thereof, what I claim is:

1. An image processing method for generating a projection of a source image, the method comprising the steps of:
    A. generating an intermediate image by a first affine transformation of the source image along a first axis relative to the source image, wherein said first transformation is executed by the steps of (1) selecting a plurality of coordinates for the intermediate image and (2) calculating for each of those selected coordinate a corresponding coordinate in the source image;
    B. generating a destination image by a second affine transformation of the intermediate image along a second axis relative to the source image wherein said second transformation is executed by the steps of (1) selecting a plurality of coordinates for destination image and (2) calculating for each of those selected coordinates a corresponding coordinate in the intermediate image; and
    C. generating a projection of the destination image along a selected one of the first and second axes.

2. A method according to claim 1, wherein step (C) comprises any of the steps of:
    A. generating a projection along an x-axis of the destination image by any of the steps of:
        i. summing intensities of pixels in the destination image in successive columns along the x-axis, or
        ii. summing counts of pixels in the destination image with intensities any of above and below a selected threshold in successive columns along the x-axis, and
    B. generating a projection along a y-axis of the destination image by any of the steps of:
        i. summing intensities of pixels in the destination image in successive rows along the y-axis, or
        ii. summing counts of pixels in the destination image with intensities any of above and below a selected threshold in successive rows of the destination image.

3. A method according to claim 1, wherein step (A) comprises
    i. defining a mapping between coordinates in the intermediate image and those in the source image; and
    ii. determining a pixel intensity for at least a selected coordinate in the intermediate image as a function of intensities of one or more pixels in a vicinity of a coordinate in the source image to which the selected coordinate maps.

4. A method according to claim 1, wherein step (B) comprises
    i. defining a mapping between coordinates in the destination image and those in the intermediate image; and
    ii. determining a pixel intensity for at least a selected coordinate in the destination image as a function of intensities of one or more pixels in a vicinity of a coordinate in the intermediate image to which the selected coordinate maps.

5. A method according to claim 1, wherein the first axis and the second axis are a y-axis and an x-axis, respectively.

6. A method according to claim 1, wherein
    step (A) comprises generating the intermediate image by affine transformation of the source image, along the first axis, in accord with a partial transformation matrix L;
    step (3) comprises generating the destination image by affine transformation of the intermediate image, along the second axis, in accord with a partial transformation matrix U; and
    where L and U are decompositions of a transformation matrix M, such that M=L·U.

7. A method according to claim 6, wherein the partial transformation matrix L is in accord with the relation $$L = \begin{bmatrix} l_{11} & 0 \\ l_{21} & l_{22} \end{bmatrix}$$

wherein $l_{11}$, $l_{21}$ and $l_{22}$ are parameters of L and wherein $l_{11}=1$.

8. A method according to claim 6, wherein the partial transformation matrix U is in accord with the relation $$U = \begin{bmatrix} u_{11} & u_{12} \\ 0 & u_{22} \end{bmatrix}$$

wherein $u_{11}$, $u_{12}$ and $u_{22}$ are parameters of U and wherein $u_{22}=1$.

9. An image processing method for generating a projection of a source image, the method comprising the steps of
    A. generating an intermediate image by affine transformation of the source image along a first axis, such generating step including
        i. defining a mapping between coordinates in the intermediate image and coordinates in the source image, wherein said step of defining the mapping includes the steps of (1) selecting a plurality of coordinates for the intermediate image and (2) calculating for each of those selected coordinates a corresponding coordinate in the source image, wherein each of the selected coordinates of the intermediate image has a pair of integer coordinates and each of the corresponding coordinates of the source image has at least one integer coordinate,
        ii. determining a pixel intensity for each selected coordinate in the intermediate image as a function of intensities of one or more pixels in a vicinity of the corresponding coordinate in the source image to which the selected coordinate maps, the pixel intensity being determined without interpolation in more than one dimension,
    B. generating a destination image by affine transformation of the intermediate image along a second axis, such generating step including
        i. defining a mapping between coordinates in the destination image and coordinates in the intermediate image, wherein said step of defining the mapping includes the steps of (1) selecting a plurality of coordinates for the destination image and (2) calculating for each of those selected coordinates a corresponding coordinate in the intermediate image, wherein each of the selected coordinates of the intermediate image has a pair of integer coordinates and each of the corresponding coordinates of the source image has at least one integer coordinate, ii. determining a pixel intensity for at least a selected coordinate in the destination image as a function of intensities of one or more pixels in a vicinity of a coordinate in the intermediate image to which the selected coordinate maps, the pixel intensity being determined without interpolation in more than one dimension, and C. generating an image processing projection of the destination image along a selected one of the first and second axes.

10. A method according to claim 9, wherein step (C) comprises any of

A. generating an image processing projection along an x-axis of the destination image by any of
  i. summing intensities of pixels in the distinction image in successive columns along the x-axis, and
  ii. summing counts of pixels in the destination image with intensities any of above and below a selected threshold in successive columns along the x-axis, and B. generating an image processing projection along a y-axis of the destination image by any of
  i. summing intensities of pixels in the destination image in successive rows along the y-axis, and
  ii. summing counts of pixels in the destination image with intensities any of above and below a selected threshold in successive rows of the destination image.

11. A method according to claim 9, wherein at least of the defining steps includes determining at least selected ones of the mapping iteratively.

12. A method according to claim 11, wherein defining step (B)(i) comprises determining mappings between coordinates in the intermediate image and $$[+1,]=[,]$$

$$[+1,]=[,]$$

those of the destination image in accord with the relations
where $x_t[i,j]$ and $y_t[i,j]$ are coordinates of a location in the intermediate image that map to a coordinate $(i,j)$ in the destination image;

$x_t[i+1,j]$ and $y_t[i+1,j]$ are coordinates of a successive location in the intermediate image that maps to a coordinate $(i+1,j)$ in the destination image; and the term $u_{11}$ is a parameter of a partial transformation matrix.

13. A method according to claim 12, wherein the defining step comprises determining mappings between coordinates in the source image and those of the intermediate image in accord with the relations $$x_s[i+1,j]=x_s[i,j]+1$$

$$y_s[i+1,j]=y_s[i,j]+l_{21}$$

where $x_s[i,j]$ and $y_s[i,j]$ are coordinates of a location in the source image that maps to a coordinate $(i,j)$ in the intermediate image;

$x_s[i+1,j]$ and $y_s[i+1,j]$ are coordinates of a location in the source image that maps to a coordinate $(i+1,j)$ in the intermediate image; and the term $l_{21}$ is a parameter of a partial transformation matrix.

14. A method according to claim 12, wherein the defining step comprises determining mappings between coordinates in the source image and those of the intermediate image in accord with the relations $$x_s[i+1,j]=x_s[i,j]-1$$

$$y_s[i+1,j]=y_s[i,j]+l_{21}$$

where $x_s[i,j]$ and $y_s[i,j]$ are coordinates of a location in the source image that maps to a coordinate $(i,j)$ in the intermediate image;

$x_s[i+1,j]$ and $y_s[i+1,j]$ are coordinates of a location in the source image that maps to a coordinate $(i+1,j)$ in the intermediate image; and the term $l_{21}$ is a parameter of a partial transformation matrix.

15. A method according to claim 12, wherein the defining step comprises determining mappings between coordinates in the source image and those of the intermediate image in accord with the relations $$x_s[i+1,j]=x_s[i,j]+l_{21}$$

$$y_s[i+1,j]=y_s[i,j]+\text{srcPitch}$$

where $x_s[i,j]$ and $y_s[i,j]$ are coordinates of a location in the source image that maps to a coordinate $(i,j)$ in the intermediate image;

$x_s[i+1,j]$ and $y_s[i+1,j]$ are coordinates of a location in the source image that maps to a coordinate $(i+1,j)$ in the intermediate image;

srcPitch is a width of the source image; and the term $l_{21}$ is a parameter of a partial transformation matrix.

16. A method according to claim 12, wherein the defining step comprises determining mappings between coordinates in the source image and those of the intermediate image in accord with the relations $$x_s[i+1,j]=x_s[i,j]+l_{21}$$

$$y_s[i+1,j]=y_s[i,j]-\text{srcPitch}$$

where $x_s[i,j]$ and $y_s[i,j]$ are coordinates of a location in the source image that maps to a coordinate $(i,j)$ in the intermediate image;

$x_s[i+1,j]$ and $y_s[i+1,j]$ are coordinates of a location in the source image that maps to a coordinate $(i+1,j)$ in the intermediate image;

srcPitch is a width of the source image; and the term $l_{21}$ is a parameter of a partial transformation matrix.

17. An image processing method for generating a projection of a source image, the method comprising the steps of:

A. generating an intermediate image by a general affine transformation of the source image along a first axis relative to the source image, said transformation mapping coordinates having two integer coordinate values in the intermediate image to respective coordinates in the source image, the general affine transformation concurrently effecting at least two transformations selected from a group of transformations including concurrently rotating, scaling, translating, skewing, and shearing, B. generating a destination image by the general affine transformation of the intermediate image along a second axis relative to the source image; and C. generating an image processing projection of the destination image along a selected one of the first and second axes.

18. A method according to claim 17, wherein step (C) comprises any of the steps of:
  A. generating a projection along an x-axis of the destination image by any of the steps of:
    i. summing intensities of pixels in the destination image in successive columns along the x-axis, or
    ii. summing counts of pixels in the destination image with intensities any of above and below a selected threshold in successive columns along the x-axis, and
  B. generating a projection along a y-axis of the destination image by any of the steps of:
    i. summing intensities of pixels in the destination image in successive rows along the y-axis, or
    ii. summing counts of pixels in the destination image with intensities any of above and below a selected threshold in successive rows of the destination image.

19. An image processing method for generating an image processing projection of a source image, the method comprising the steps of:
  A. generating an intermediate image by a first affine transformation of the source image along a first axis relative to the source image, wherein said first affine transformation is executed by the steps of (1) selecting a plurality of coordinates for the intermediate image and (2) calculating for each of those selected coordinate a corresponding coordinate in the source image, where each of the selected coordinates of the intermediate image has a pair of integer coordinates and each of the corresponding coordinates of the source image has at least one integer coordinate,
  B. generating a destination image by a second affine transformation of the intermediate image along a second axis relative to the source image wherein said second affine transformation is executed by the steps of (1) selecting a plurality of coordinates for destination image and (2) calculating for each of those selected coordinates a corresponding coordinate in the intermediate image, where each of the selected coordinates of the destination image has a pair of integer coordinates and each of the corresponding coordinates of the intermediate image having at least one integer coordinate; and
  C. generating an image processing projection of the destination image along a selected one of the first and second axes.

20. A method according to claim 19, wherein step (C) comprises any of the steps of:
  A. generating an image processing projection along an x-axis of the destination image by any of the steps of:
    i. summing intensities of pixels in the destination image in successive columns along the x-axis, or
    ii. summing counts of pixels in the destination image with intensities any of above and below a selected threshold in successive columns along the x-axis, and
  B. generating an image processing projection along a y-axis of the destination image by any of the steps of:
    i. summing intensities of pixels in the destination image in successive rows along the y-axis, or
    ii. summing counts of pixels in the destination image with intensities any of above and below a selected threshold in successive rows of the destination image.

21. A method according to claim 19, wherein step (A) comprises
  i. defining a mapping between coordinates in the intermediate image and those in the source image; and
  ii. determining a pixel intensity for at least a selected coordinate in the intermediate image as a function of intensities of one or more pixels in a vicinity of a coordinate in the source image to which the selected coordinate maps.

22. A method according to claim 19, wherein step (B) comprises
  i. defining a mapping between coordinates in the destination image and those in the intermediate image; and
  ii. determining a pixel intensity for at least a selected coordinate in the destination image as a function of intensities of one or more pixels in a vicinity of a coordinate in the intermediate image to which the selected coordinate maps.

23. A method according to claim 19, wherein the first axis and the second axis are a y-axis and an x-axis, respectively.

24. A method according to claim 19, wherein
  step (A) comprises generating the intermediate image by affine transformation of the source image, along the first axis, in accord with a partial transformation matrix L;
  step (B) comprises generating the destination image by affine transformation of the intermediate image, along the second axis, in accord with a partial transformation matrix U; and
  where L and U are decompositions of a transformation matrix M, such that M=L·U.

25. A method according to claim 24, wherein the partial transformation matrix L is in accord with the relation $$L = \begin{bmatrix} l_{11} & 0 \\ l_{21} & l_{22} \end{bmatrix}$$

wherein $l_{11}$, $l_{21}$ and $l_{22}$ are parameters of L and wherein $l_{11}=1$.

26. A method according to claim 25, wherein the partial transformation matrix U is in accord with the relation $$U = \begin{bmatrix} u_{11} & u_{12} \\ 0 & u_{22} \end{bmatrix}$$

wherein $u_{11}$, $u_{12}$ and $u_{22}$ are parameters of U and wherein $u_{22}=1$.

* * * * *